United States Patent [19]
Zandi et al.

[11] Patent Number: 5,456,751
[45] Date of Patent: Oct. 10, 1995

[54] PARTICULATE RUBBER INCLUDED CONCRETE COMPOSITIONS

[75] Inventors: Iraj Zandi, Radnor; John Lepore, Springfield; Hossein Rostami, Philadelphia, all of Pa.

[73] Assignee: Trustees of the University of Pennsylvania, Philadelphia, Pa.

[21] Appl. No.: 338,895

[22] Filed: Nov. 14, 1994

Related U.S. Application Data

[63] Continuation of Ser. No. 116,454, Sep. 3, 1993, abandoned.

[51] Int. Cl.$^6$ .................................................. C04B 18/22
[52] U.S. Cl. ........................... 106/724; 106/696; 106/745; 404/32
[58] Field of Search .................... 106/724–728, 106/731, DIG. 1, DIG. 7, 823, 696, 745; 404/32

[56] References Cited

U.S. PATENT DOCUMENTS

| | | | |
|---|---|---|---|
| 4,118,137 | 10/1978 | LaGrone et al. | 404/76 |
| 4,615,809 | 10/1986 | King | 106/DIG. 1 |
| 5,244,304 | 9/1993 | Weill et al. | 106/721 |
| 5,290,356 | 5/1994 | Frankowski | 106/726 |

FOREIGN PATENT DOCUMENTS

| | | |
|---|---|---|
| 121-744 | 8/1976 | Germany . |
| 55-013322 | 1/1980 | Japan . |
| 55-059948 | 5/1980 | Japan . |

*Primary Examiner*—Mark L. Bell
*Assistant Examiner*—Paul Marcantoni
*Attorney, Agent, or Firm*—Woodcock, Washburn, Kurtz, Mackiewicz & Norris

[57] ABSTRACT

Concrete compositions are provided which contain particulate rubber, preferably recycled rubber from such sources as automobile tires, in amounts between about 0.05 and about 20 percent by weight of the concrete composition. The concrete compositions further contain portland cement, water, and an aggregate material. Additional materials such as superplasticizers and fly ash can also be admixed with the concrete compositions.

22 Claims, 1 Drawing Sheet

PARTICULATE RUBBER INCLUDED CONCRETE COMPOSITIONS

This is a continuation of application Ser. No. 08/116,454, filed Sep. 3, 1993, now abandoned.

FIELD OF THE INVENTION

The present invention relates to concrete compositions containing particulate rubber. More particularly, the particulate rubber is derived from recycling sources, such as recycled automobile tires.

BACKGROUND OF THE INVENTION

At the present time, approximately 250 million scrap, used tires are generated each year in the United States and correspondingly high number of scrap tires are also generated annually elsewhere throughout the world. In the United States, about 15 percent of these tires are reused— most by burning to recover the energy content, with other uses including fabrication into other materials, reclamation for use as tires, and for use in asphalt rubber. The remainder of the used tires are either landfilled or stockpiled. Currently, approximately 2–3 billion tires are stockpiled in the United States, posing both an environmental and a health hazard.

Recycling of rubber tires with asphalt for road resurfacing and other uses has been attempted as a way to utilize the volume of scrap tires. However, problems exist with the cost and implementation of such compositions. The use of recycled rubber with cement and such additives as a bituminous binder and adhesives has been suggested to an extent in German patent specification 121744. The particulate rubber is stated as having a maximum grain size of about 25 mm, and no preferred particle size ranges are set forth.

A need exists in the field to provide a cementous composition containing a recycled particulate rubber which composition can be used for various road surface or structural applications. A particular area to be addressed is the determination of a type of particulate rubber that provides superior properties when admixed in a cementous composition.

SUMMARY OF THE INVENTION

Concrete compositions are provided which contain particulate rubber, preferably recycled rubber from such sources as automobile tires, in amounts between about 0.05 and about 20 percent by weight of the concrete composition. The concrete compositions further contain portland cement, water, and an aggregate material. Additional materials such as plasticizers or superplasticizers and fly ash can also be admixed with the concrete compositions.

A preferred particle size distribution for the particulate rubber is one such that from about 50–95 weight percent of the rubber particles pass through a ⅜ inch. sieve, about 20–75 weight percent of the rubber particles pass through a No. 4 sieve, and from about 0–30 weight percent of the particles pass through a No. 8 sieve. Generally less than about 10 weight percent of the rubber particles are retained on a 0.5 inch sieve.

The concrete compositions formed from casting the concrete compositions are also provided.

DETAILED DESCRIPTION OF THE INVENTION

Figure 1:
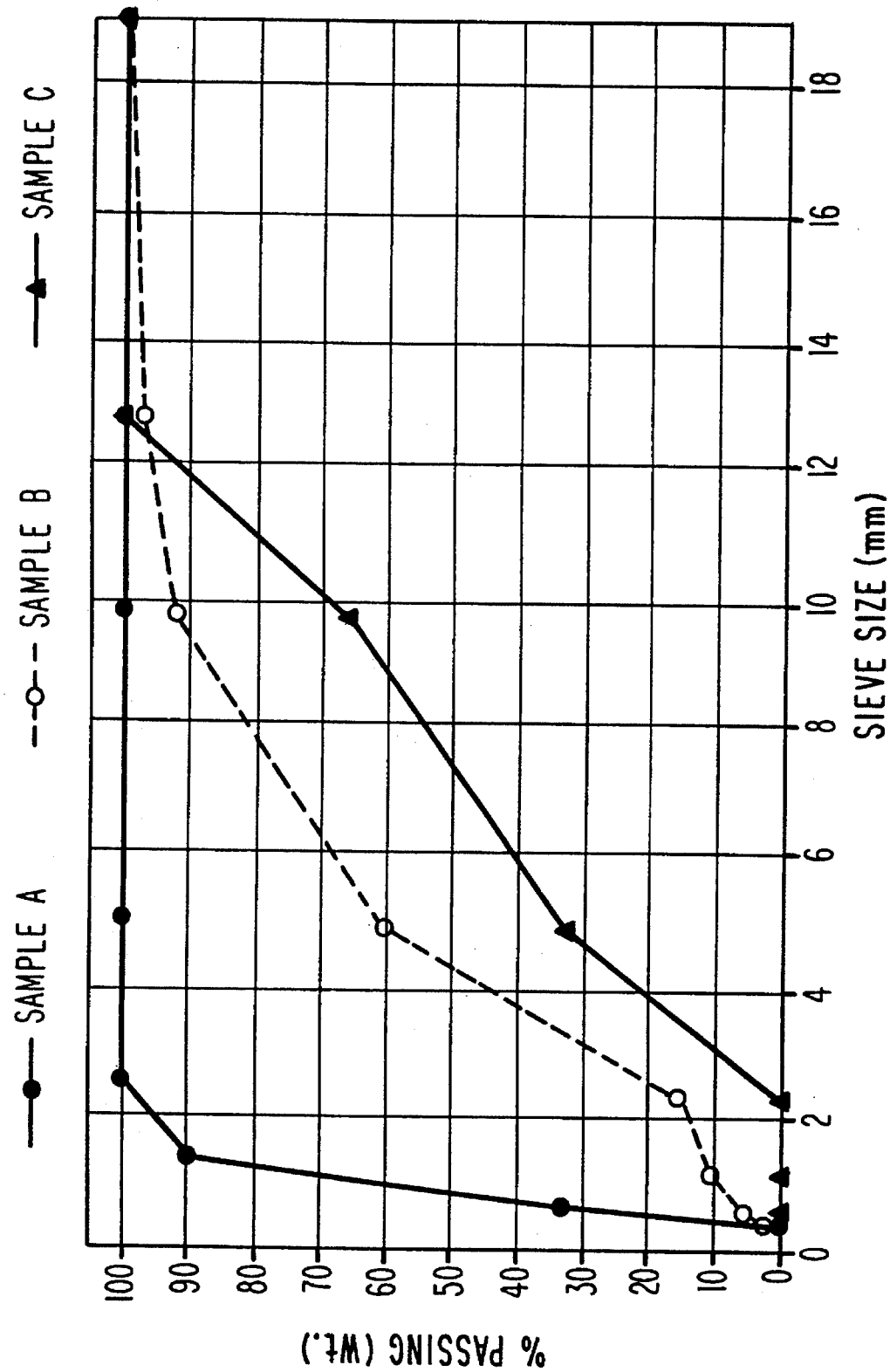
FIG. 1 is a graph showing the particle size distribution for the particulate rubber samples used in making the concrete compositions described in Example 1.

The present invention provides concrete compositions utilizing rubber as a component of the composition and also provides the composite structures made from those compositions. The preferred source of the rubber constituent in the compositions is as a recycled rubber from such sources as recycled automobile tires. The compositions of the present invention are termed "concrete" in that they generally contain a mixture of portland cement, water, and fine and coarse aggregate in addition to the rubber component.

The rubber employed in the present invention can be of any source, however the rubber is preferably from a polybutadiene rubber, a styrene-butadiene rubber, or a cis-1,4-polyisoprene rubber—either synthetic or natural in origin. The rubber is preferably ground to provide a particular particle size distribution that is beneficial for use in a concrete composition. The preferred rubber component material generally has a particle size distribution such that about 95 weight percent of the particles are below about 20 mm, preferably below about 13 mm, more preferably about 95 weight percent of the particles are below about 10 mm and not larger than about 18 mm, and even more preferably below about 10 mm and not larger than 13 mm; 50 weight percent of the particles are below about 3 mm and not larger than about 12 mm, preferably below about 5 and not larger than about 10 mm, and more preferably below about 6 mm and not larger than 9 mm; and 10 weight percent of the particles greater than 1 mm, preferably greater than 2 mm, more preferably 10 weight percent of the particles are greater than about 1 mm and below about 5 mm, and even more preferably greater than about 2 mm and below about 5 mm. This particle size distribution can easily be determined by sieve analysis followed by plotting the weight percent passing through the sieve against the sieve size as shown in FIG. 1 for a sieve analysis. The particle size distribution for the preferred rubber material can also be described by the sieve separation data. The preferred size distribution is one in which from about 50–95, preferably about 50–80, and more preferably 55–75, weight percent of the particles pass through a ⅜ in. (9.5 mm) sieve; from about 20–75, preferably from about 20–60, and more preferably from 25–45, weight percent of the particles pass through a No. 4 sieve (0.187 in., 4.75 mm); from about 0–30, preferably from about 0–20, and more preferably from about 0–10, weight percent of the particles pass through a No. 8 sieve (0.094 in., 2.36 mm); while less than about 10, preferably less than about 5, more preferably less than about 2, weight percent of the particles are retained on a 0.5 in. (12.5 mm) sieve. An advantageous rubber sample can be obtained by screening the rubber sample and retaining that portion that is retained on a No. 8 sieve and passing through a 0.5 in. sieve, the particle size distribution of that sample preferably being substantially uniform.

The rubber used in the concrete compositions is preferably obtained as a recycled material. Recycled rubber primarily is obtained from tires used for automobiles and the like. These tires are generally a composite containing several components such as natural and synthetic rubbers; processing aids such as petroleum oils that act as plasticizers or softeners; accelerators such as xanthates like dibutylxanthogen disulfide; crosslinking materials such as sulfur; fillers such as carbon black; and cords such as steel wire coated with brass. The rubber components are primarily polybutadiene rubber, styrene-butadiene rubber, and cis-1,4-polyisoprene rubber—either synthetic or natural in origin.

The rubber that originates as a recycled tire is preferably processed prior to utilization for the present invention. The tire tread, or rubber portion, is preferably removed from any cords present in the tire structure. The rubber can be subjected to further processing to remove hydrophilic and hydrophobic contaminants in the recycled tire or introduced during the grinding process. Solvents such as water, carbon tetrachloride, and other commonly used industrial solvents, and combinations thereof can be used to wash the tire rubber material.

The concrete compositions contain conventional constituents such as portland cement, water, and aggregate. Portland cement contains tricalcium silicate and dicalcium silicate. The most common constituents used to manufacture portland cement include: CaO, $SiO_2$, $Al_2O_3$, $Fe_2O_3$, MgO, $SO_3$, $Na_2O$, $K_2O$, $CO_2$, $H_2O$, and $Ca_3SiO_5$. The calcium oxide reacts with the acidic compounds at high temperatures to yield portland cement clinker that contains the following compounds: $Ca_3O_3$, $Ca_3SiO_5$, $Ca_2SiO_4$, $Ca_3Al_2O_5$, and $Ca_4Al_2Fe_2O_{10}$. These products are ground to a fine powder to form the portland cement.

The aggregate used in the concrete compositions can generally be defined in two classes: fine and coarse. Fine aggregate is typically a sand material and generally has a particle size distribution in accordance with the standard distribution set forth in ASTM C-33 which is incorporated herein by reference in its entirety. The coarse aggregate is typically a stone material and generally has a particle size distribution in accordance with the standard distribution set forth in ASTM C-33 for sizes ranging between about ⅜ in. and about 3 in. material.

The relative proportions of each constituent in the concrete compositions can vary depending upon the desired compressive strength sought from the final cured composition. Other properties, such as modulus of elasticity, shrinkage, creep, durability, and impermeability can also be affect by the compositional formulation of the mixture. Generally, the amount of rubber used in the concrete composition will be at least about 0.05% wt. and below about 20% wt., preferably below about 15% wt., more preferably from about 0.05–10% wt., and most preferably from about 0.1–5% wt. of the composition. The portland cement is present in an amount of from about 5–30% wt., preferably from about 5–20% wt., and more preferably from about 10–20% wt. of the concrete composition. The water is present from about 3–20% wt., preferably from about 3–15% wt., and more preferably from about 4–10% wt. of the concrete composition. The aggregate is present from about 10–85% wt., preferably from about 20–55% wt., and more preferably from about 25–50% wt. of the concrete composition. The aggregate can be a mixture of fine and coarse aggregate. The fine aggregate is generally present in an amount of from about 10–50% wt., preferably from about 10–45% wt., and more preferably from about 10–40% wt. of the concrete composition. The coarse aggregate, if present, can be present in an amount of up to about 50% wt., generally from about 0.1–45% wt., preferably from about 10–45% wt., and more preferably from about 15–40% wt. of the concrete composition. In certain instances, the rubber component can entirely replace the coarse aggregate addition.

The compressive strength of a concrete composition containing incorporated particulate rubber can be increased by admixing selected additive agents. To enhance the workability of the mixture, it is convenient to add a relatively small amount of fly ash to the composition, preferably in place of the cement. A beneficial aspect of this is that fly ash is also a waste by-product, primarily from electric generation facilities, and therefore its inclusion in the composition recycles other waste materials. Fly ash is produced from the combustion of coal and the components that are typically tested for use as a mineral admixture according to ASTM C-618 are: $SiO_2$, $Al_2O_3$, $Fe_2O_3$, $SO_3$, MgO, $Na_2O$, and uncombusted hydrocarbons. Fly ash is a siliceous and aluminous material that when provided in a finely divided form, and in the presence of moisture, chemically reacts with calcium hydroxide to form compounds with cementitous properties.

The incorporation of the fly ash generally requires a corresponding increase in the amount of water to the concrete composition to ensure proper mixing and workability. However, it has been found that higher levels of water result in low compressive strengths for the final product. Therefore, it has been found that the incorporation of a small amount of a plasticizer into the composition, preferably to replace a portion of the water, provides a composition having acceptable compression strengths. The plasticizer basically functions as a surfactant by dispersing the portland cement through the concrete composition and allowing for the decrease in the amount of water required for a given consistency. Plasticizers have been used for at least about 25 years, and recently have been replaced to an extent by superplasticizers. Superplasticizers are commonly used materials in the concrete industry and generally extend the slump retention of the concrete mixture, such superplasticizers are commercially available, for example, from Master Builders, Inc., Cleveland, Ohio as Pozzolith 220N superplasticizer. The superplasticizers are commonly salts, either calcium or sodium, of beta-naphthalene sulfonate polymers.

The fly ash is generally used in the concrete compositions in an amount up to about 6% wt., preferably up to about 3% wt., and more preferably up to about 1.5% wt. of the concrete composition. If present, the fly ash is generally admixed in an amount of at least about 0.01% wt., preferably at least about 0.1% wt. of the concrete composition. The superplasticizer is generally used in the concrete compositions in an amount up to about 2% wt., preferably up to about 0.5% wt., and more preferably up to about 0.3% wt. of the concrete compositions. If present, the superplasticizer is generally admixed in an amount of at least about 0.01% wt., preferably at least about 0.05% wt. of the concrete compositions.

The blending of the rubber with the portland cement, water, and aggregate, wherein the rubber content is below about 20% wt. can be used to formulate cured concrete composites having compressive strengths (ASTM C192-76) of from about 100–5000 psi. The addition of fly ash and superplasticizer allows for attainment of compressive strengths of from at least about 2500 psi, preferably at least about 3000 psi, more preferably at least about 3500 psi, and in some cases at least about 4500 psi.

A particularly preferred composition contains from about 14.9–17.5 wt. % portland cement, 7.0–7.5 wt. % water, 36.4–37.5 wt. % fine aggregate, 38.2–39.3 wt. % coarse aggregate, 0.7–0.8 wt. % particulate rubber, and about 0.08–0.1 wt. % superplasticizer. The mixture can also contain fly ash, in an amount up to about 1.3 wt. %.

It has also been found that an increase in the compression strength of the concrete composition can be obtained by employing a fine aggregate material having a particle size distribution such that a higher concentration of particles passing through a No. 30 sieve (0.023 in., 600 μm) than an ASTM C-33 standard material. The preferred fine aggregate material has a particle size distribution such that from about 70–90, more preferably from about 75–85, weight percent of the material passes through a No. 30 sieve, and from about 92–100, more preferably from about 95–100, weight percent of the material passes through a No. 16 sieve (0.047 in., 1180 μm). A particularly preferred composition employing this fine aggregate material contains from about 11.5–15.4 wt. % portland cement, 5.3–7.1 wt. % water, 14.4–23.6 wt. % fine aggregate, 12.9–21.5 wt. % coarse aggregate, 0.1–1.5 wt. % particulate rubber, and about 0.07–0.12 wt. % superplasticizer. The mixture can also contain fly ash, in an amount up to about 1.3 wt. %. Such compositions can achieve compression strengths of at least about 4000 psi, preferably at least about 4500 psi, and more preferably at least about 5000 psi.

Several advantageous properties can be realized with the rubberized concrete. The inclusion of the rubber into the concrete mixture provides for a finished concrete composite having a lower density. This decrease in the density of the concrete is further enhanced by the inclusion of the fly ash component. The resulting concrete composite is thus lighter and would increase the live load capacity of the rubberize included concrete (RIC). The RIC also provides a more ductile composite than conventional concrete. The RIC can also be utilized as a composite for noise barrier applications and also in applications requiring improved heat insulation, vibration dampening, toughness, and impact resistance.

EXAMPLES

Example 1

Effect of Particle Size oil the Particulate Rubber

Various grades of particulate rubber were prepared in a concrete mixture. The concrete mixes were then cast and tested for compression strengths.

Three particulate rubber samples having particle size distributions as shown in FIG. 1 were used for the study. Sample A had a very, narrow particle size distribution with about 100% of the particles below about 3 mm. Sample B had the widest distribution with about 99 wt. % of the particles below about 18 mm and about 50 wt. % of the particles at about 4 mm and about 10 wt. % of the particles below about 1 mm. Sample C had a narrower distribution with about 99 wt. % of the particles below about 12.5 mm and about 50 wt. % of the particles at about 7.5 mm and about 10 wt. % of the particles below about 3 mm and about 0 wt. % below 2 mm.

Concrete mixes were prepared with the rubber samples in accordance with the mixture set forth in Table 1. A control sample was also prepared having no added rubber, the weight of the rubber being replaced by coarse aggregate.

TABLE 1

| COMPONENT | AMOUNT |
| --- | --- |
| Portland Cement | 12.1 lbs. |
| Water | 5.6 lbs. |
| Fine Aggregate[1] | 29 lbs. |
| Coarse Aggregate[2] | 31.9 lbs. |
| Rubber | 2 lbs. |
| Superplasticizer[3] | 58 ml |

[1]ASTM C-33
[2]ASTM C-33
[3]Pozzolith 220 - N (Master Builders, Inc.)

The coarse aggregate and rubber were added to a machine mixer with a portion of the water. The mixer was started and the fine aggregate, portland cement, superplasticizer, and remaining water were added and the mixer was allowed to turn for about three minutes. The concrete blend was then allowed to sit for about three minutes, and then mixed again for about two minutes.

The concrete mixes were then used to prepare specimens for a compression test (ASTM C-39). The results of the compression tests for the different rubber samples are set forth in Table 2. As can be seen from the results, the compression strength was significantly increased for the Sample B rubber in comparison to the Sample A rubber, and the compression strength was further increased for the Sample C rubber having a more refined particle size distribution.

TABLE 2

| RUBBER SAMPLE | COMPRESSION STRENGTH (psi) |
| --- | --- |
| A | 1900 |
| B | 2250 |
| C | 3000 |
| Control | 4000 |

Example 2

Inclusion of Fly Ash

A concrete mixture was prepared containing fly ash as a mineral admixture component. The concrete mixture used is set forth in Table 3.

TABLE 3

| COMPONENT | AMOUNT |
| --- | --- |
| Portland Cement | 12.5 lbs. |
| Water | 5.6 lbs. |
| Fine Aggregate[1] | 22.6 lbs. |
| Course Aggregate[2] | 26.6 lbs. |
| Rubber[3] | 2 lbs. |
| Fly Ash | 1.5 lbs. |
| Super plasticizer[4] | 58 ml |

[1]ASTM C-33
[2]ASTM C-33
[3]Passed through 0.5 inch sieve and retained on a 0.09 inch sieve.
[4]Pozzolith 220-N The concrete components were combined using the procedure set forth in Example 1 with the fly ash being admixed with the cement. The compression strength of the resulting concrete (ASTM C-39) was about 3500 psi.

What is claimed is:

1. A concrete composition comprising portland cement and particulate rubber, said rubber being present in an amount between about 0.05 and about 20 weight percent of the concrete composition; said rubber having a particle size distribution such that from about 50–95 weight percent of the rubber particles pass through a ⅜ inch sieve and about 20–75 weight percent of the rubber particles pass through a No. 4 sieve.

2. The composition of claim 1 wherein the particle size distribution of the particulate rubber is such that from 0–30 weight percent of the rubber particles pass through a No. 8 sieve and less than 10 weight percent of the rubber particles are retained on a 0.5 inch sieve.

3. The composition of claim 2 wherein the portland cement is present in an amount of from about 5 to about 20 weight percent of the composition.

4. The composition of claim 2 further comprising fly ash in an amount up to about 6 weight percent of the composition.

5. The composition of claim 2 further comprising superplasticizer in an amount up to about 2 weight percent of the composition.

6. The composition of claim 2 wherein the portland cement is present in an amount of from about 5 to about 20 weight percent, and the rubber is present in an amount of from about 0.05 to about 15 weight percent, of the composition.

7. The composition of claim 6 further comprising fly ash in an amount up to about 3 weight percent of the composition.

8. The composition of claim 6 further comprising superplasticizer in an amount up to about 0.5 weight percent of the composition.

9. The composition of claim 6 wherein the rubber comprises a cis-1,4-polyisoprene, a polybutadiene or a styrenebutadiene rubber.

10. The composition of claim 9 wherein the particle size distribution of the rubber is further defined such that 55–75 weight percent of the rubber particles pass through a ⅜ inch sieve, from 25–45 weight percent pass through a No. 4 sieve, and from about 0–10 weight percent pass through a No. 8 sieve.

11. The composition of claim 10 wherein the portland cement is present in an amount of from about 5 to about 20 weight percent, and the rubber is present in an amount of from about 0.1 to about 5 weight percent of the composition.

12. The composition of claim 11 further comprising sand in an amount of from about 10 to about 40 weight percent of the composition.

13. The composition of claim 11 further comprising stone in an amount of from about 15 to about 40 weight percent of the composition.

14. The composition of claim 11 further comprising water in an amount of from about 4 to about 10 weight percent of the composition.

15. A cured concrete composite comprising portland cement and particulate rubber, said rubber being present in an amount between 0.05 to about 20 weight percent of the composite; said rubber having a particle size distribution such that from about 50–95 weight percent of the rubber particles pass through a ⅜ inch sieve and about 20–75 weight percent of the rubber particles pass through a No. 4 sieve.

16. The composite of claim 15 wherein the particle size distribution of the rubber is further defined such that 55–75 weight percent of the rubber particles pass through a ⅜ inch sieve, from 25–45 weight percent pass through a No. 4 sieve, and from about 0–10 weight percent pass through a No. 8 sieve.

17. The composition of claim 16 wherein the portland cement is present in an amount of from about 5 to about 20 weight percent, and the rubber is present in an amount of from about 0.1 to about 5 weight percent of the composite.

18. The composite of claim 17 further comprising superplasticizer in an amount up to about 2 weight percent of the composition.

19. The composite of claim 18 having a compression strength of at least about 3500 psi.

20. A concrete composition comprising:
  (a) binder for concrete consisting essentially of portland cement;
  (b) particulate rubber, said rubber being present in an amount between about 0.05 and about 20 weight percent of the concrete composition; said rubber having a particle size distribution such that from about 50–95 weight percent of the rubber particles pass through a ⅜ inch sieve and about 20–75 weight percent of the rubber particles pass through a No. 4 sieve; and
  (c) sand present in an amount between about 10 and about 40 weight percent of the concrete composition; said sand having a particle size distribution such that from about 70–90 weight percent of the sand particles pass through a No. 30 sieve and about 92–100 weight percent of the sand particles pass through a No. 16 sieve.

21. The composite of claim 15 having a compression strength of at least about 3500 psi.

22. The composite of claim 16 having a compression strength of at least about 3500 psi.

* * * * *